Nov. 5, 1968   J. R. McNEIL   3,408,873
PULSED INTEGRATING PENDULUM ACCELEROMETER
Filed March 29, 1965   8 Sheets-Sheet 1

PART A
NEGATIVE TORQUE MODE

PART B
POSITIVE TORQUE MODE

INVENTOR
JOHN R. McNEIL

BY
Claude Funkhouser
ATTORNEY
Robert F. Beers
AGENT

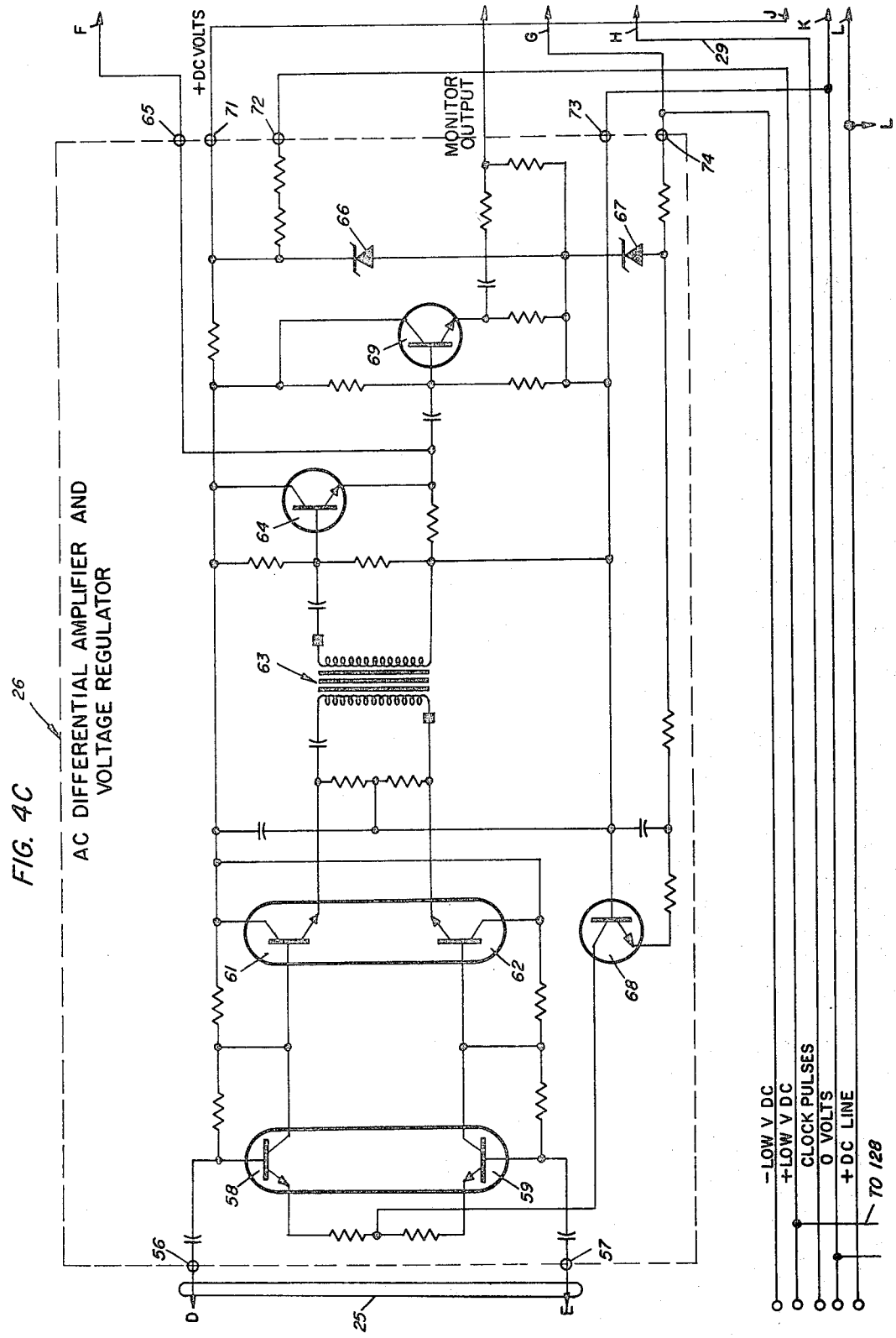

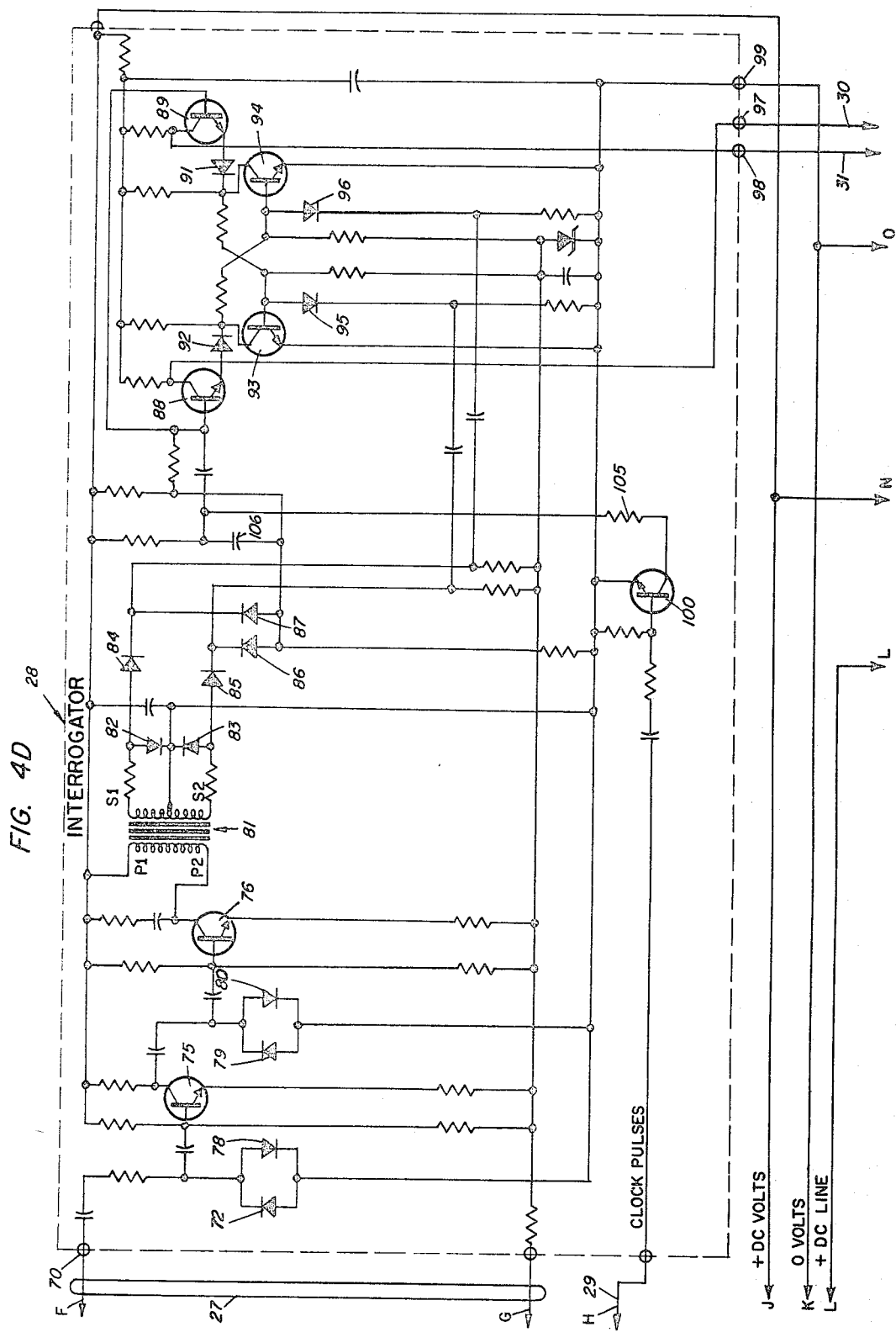

FIG. 4E

United States Patent Office

3,408,873
Patented Nov. 5, 1968

3,408,873
PULSED INTEGRATING PENDULUM
ACCELEROMETER
John R. McNeil, Weston, Mass., assignor, by mesne assignments, to the United States of America as represented by the Secretary of the Navy
Filed Mar. 29, 1965, Ser. No. 444,516
9 Claims. (Cl. 73—517)

ABSTRACT OF THE DISCLOSURE

The apparatus is an accelerometer measuring system having a velocity output, quantized to discrete values of velocity and having a direct digital output. The accelerometer utilized is of the pulse pendulum type which supplies an electrical signal during times of acceleration indicative of the amount of acceleration.

---

This invention relates generally to accelerometers and more particularly to an accelerometer measuring system which has a velocity output, quantized to discrete values of velocity, and has a direct digital output.

Navigation and steering are techniques necessary to every guidance system. Navigation may be accomplished by the simplest type of pilotage, i.e., observation of a present position by reference to known points of reference on a map and operation of the speed or magnitude of motion and the direction to or from a reference point. Once a position has been established, with respect to a reference point, it then becomes necessary to change or maintain motion and direction in order to travel from a present position to some desired destination. Whenever guidance problems become complex, it is necessary to provide additional or other apparatus to augment the maps or charts used in pilotage. In many cases, automatic or semiautomatic apparatus are necessary to solve the navigation and steering problem in order that instantaneous solutions are effected for the most efficient guidance techniques possible.

Numerous techniques have been used and are presently in use for providing guidance for missiles or space vehicles. Some are totally automatic while others have various degrees of automatic control. Prior ballistic missiles use various forms of radar or optical systems for monitoring the guided phase of a missile in flight. One such technique uses a system in which radar measures the velocity and position of a missile as it travels along a flight trajectory. Another system, with much the same technique, is the technique of computing a new trajectory at each or a number of predetermined points along the actual missile trajectory; and adjusting the direction and velocity of the missile accordingly, to provide a new course of flight and missile cutoff condition to cause the missile to impact on the target or within a predetermined area of the target.

The two techniques of the prior art have essentially the same disadvantages; that is, control is needed from observing or tracking points along the missiles, direction of travel, and command signals must be transmitted to control the missile as it is in flight. Militarily, this is not feasible because of the possibility of losing control of the missile due to failure of missile reception to the command signal, or due to the inability of the command signals to break through enemy jamming signals or possible interfering atmospheric conditions.

A guidance system technique was necessary which would be completely self-contained, and capable of furnishing all of the elements required for control of a ballistic missile once it is launched. The inertial guidance offered the most practical solution to providing a guidance system that is wholly contained in the missile. The inertial concept is based upon measurements made with respect to inertial space; that space and reference frame for which Newton's law of motion is valid. Generally, the inertial guidance measurements made with respect to inertial space are those measurements which involve angle and/or linear motion of a frame of reference with respect to an inertial frame of reference. The reference system usually takes the form of a gyro-stabilized platform. The gyros maintain the stable platform at a predetermined reference by feeding back error signals as the platform drifts or is moved from the predetermined reference point. Positioned on the stabilized platform along predetermined axes are accelerometers.

In order to successfully accomplish the function of position and velocity indication in an inertial navigation and guidance system, it is necessary to have measurements and integration of linear acceleration. The measurement of a ballistic missile's acceleration and the subsequent integration of the acceleration must be made accurately. It is the primary function of accelerometers positioned on a stable platform along predetermined axes to provide signals which are proportional to the measurement of acceleration in a known reference frame. In some application two accelerometers along two axes are sufficient to accomplish navigation and guidance. However, in more sophisticated applications, three accelerometers along three axes are required.

Thus it is apparent that the accelerometer is the basic measuring element in an inertial navigation and guidance system. Prior art accelerometers usually give an analog signal output which is proportional to sensed accelerations. In present day missile systems, due to the rapid advance of the ballistic missile art, many airborne and other inertial systems now require digital computers rather than analog computers. In such cases, the acceleration measurements must be furnished in digital form for processing in the computer. If an accelerometer is used that has an analog output, an additional unit is required; an analog to digital converter. The disadvantages of having such converters are that they add error to the measured acceleration and also add size and weight to the inertial guidance system.

The instant invention provides an accelerometer system which is capable of being used in ballistic missile systems that have accuracy requirements which utilize digital computation. This accelerometer system presents sensing information to the computer directly in digital form and also this accelerometer measuring system has a velocity output, quantized to discrete values of frequency and is capable of syncronization with the digital computer used.

The rapid advance of inertial systems has developed a variety of precision accelerometers capable of providing measurements of acceleration. These prior art accelerometers may be broken down generally into two classifications: pendulous accelerometers and nonpendulous accelerometers. Neither of these general types have an accelerometer that provides a direct digital output.

It is therefore an object of this invention to provide a pendulous accelerometer which is capable of use with ballistic missile guidance systems which use digital computation.

It is another object of this invention to provide an acceleration measuring system which is capable of direct synchronization with a guidance digital computer.

Another object of this invention is to provide an accelerometer which is simple and compact.

Another object of the present invention is the provision of an accelerometer which has extremely high stability.

A further object of the present invention is the provision of an accelerometer system which is essentially trouble free.

A still further object of the present invention is the provision of an accelerometer system which is insensitive to mechanical unbalances.

Another object of the present invention is the provision of an accelerometer which is less complex than prior art accelerometers.

Another object of the present invention is the provision of an accelerometer which is extremely simple to test for proper operation.

Another object of the present invention is the provision of an accelerometer system that has its electronic subcomponents adaptable to silicon semiconductors.

Another object of the present invention is the provision of an accelerometer system which has extreme stability and which requires very little warmup time.

Still another object of the present invention is the provision of an accelerometer system that has ability to maintain long time accuracy and stability.

A further object of the present invention is the provision of an accelerometer which has little deviation of indicated acceleration from input acceleration.

Another object of the present invention is the provision of an accelerometer which has a low threshold value.

Still another object of the present invention is the provision of a pendulous accelerometer which has extremely good null repeatability, extremely low threshold, and good linearity over large dynamic ranges.

Another object of the present invention is the provision of an accelerometer which provies electrical output signals that are proportional to physical accelerations.

Other objects, advantages and novel features of the invention will become apparent from the following detailed description of the invention when considered in conjunction with the accompanying drawings wherein.

FIGS. 4A, 4B, 4C, 4D, 4E and 4F together show the overall schematic of the pulse integrating pendulum accelerometer system with detail as to the electronic component makeup of the various components of the accelerometer system.

Figure 1:
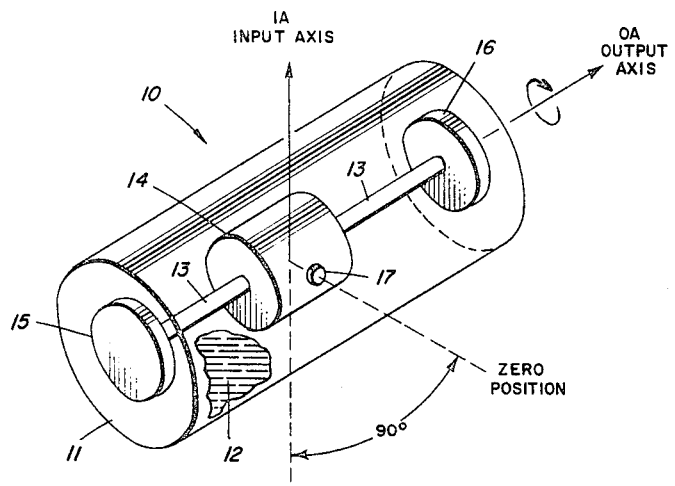
FIG. 1 shows a functional schematic of the pulsed integrating pendulum inertial component of the pulse integrating pendulum accelerometer system.

Referring now to FIG. 1, which shows a pulse integrating pendulum unit indicated generally as numeral 10. A cylindrical outer case 11 houses the components which make up the pulse integrating pendulum. Inside case 11 and supported by jeweled bearings (not shown) at either end of the case 11 is a cylindrical radially balanced mass or pendulum 14 floated in a dampening fluid 12. Pendulum 14 is centrally positioned in case 11 by a supporting shaft 13. Shaft 13 also supports the rotor element of torque generator microsyn 15 positioned at one end of cylindrical case 11 and the rotor element of signal generator microsyn 16 positioned at the other end of case 11. Either end of the shaft 13 extends through the bottom of cylindrical case 11 on jeweled bearings (not shown). Microsyns 15 and 16, respectively, in addition to serving as torque generator and signal generator, respectively, also provide magnetic suspension of pendulum 14. Positioned on the rounded surface of the pendulum 14 and centrally located from either of its ends is unbalancing mass 17. As illustrated in the drawing, the unbalancing mass 17 is positioned so that it is at right angles to the input axis IA which is positioned at right angles to the longitudinal axis of the pendulum 14. The output axis designated as OA is shown as a rotating movement of the pendulum 14 about its longitudinal axis.

In order to provide the necessary background for a complete understanding of the function of the apparatus shown in FIG. 1, a basic theoretical discussion of its operation follows.

Figure 2:
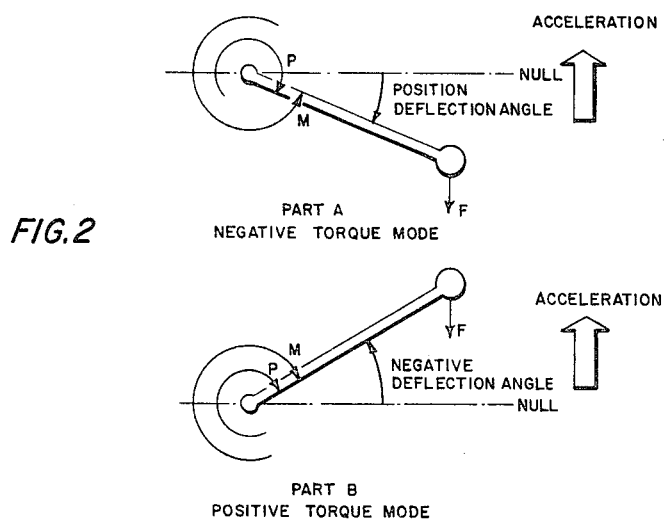
FIG. 2 shows a functional diagram of the pulse integrating pendulum, one view showing a positive deflection angle and the other view showing a negative deflection angle.

Referring now to FIG. 2, parts A and B, which shows an acceleration in the direction of the arrow existing on the pulsed integrating pendulum 10. The acceleration force in the direction indicated causes an inertial force to be felt by the unbalanced mass 17. This force F acting about the pendulum pivot axis, which is the pulse integrating pendulum output axis OA, generates a pendulous torque indicated as P. Pendulous torque P is proportional to the linear acceleration experienced by the pulsed integrating pendulum 10. Torque M shown as aiding or opposing torque P is the torque force exerted by the torque generator microsyn 15 located on the pulsed integrating pendulum's output axis OA. Torque M is of constant magnitude and within the acceleration range of the pulse integrating pendulum accelerometer and it always exceeds the pendulous torque P.

Figure 3:
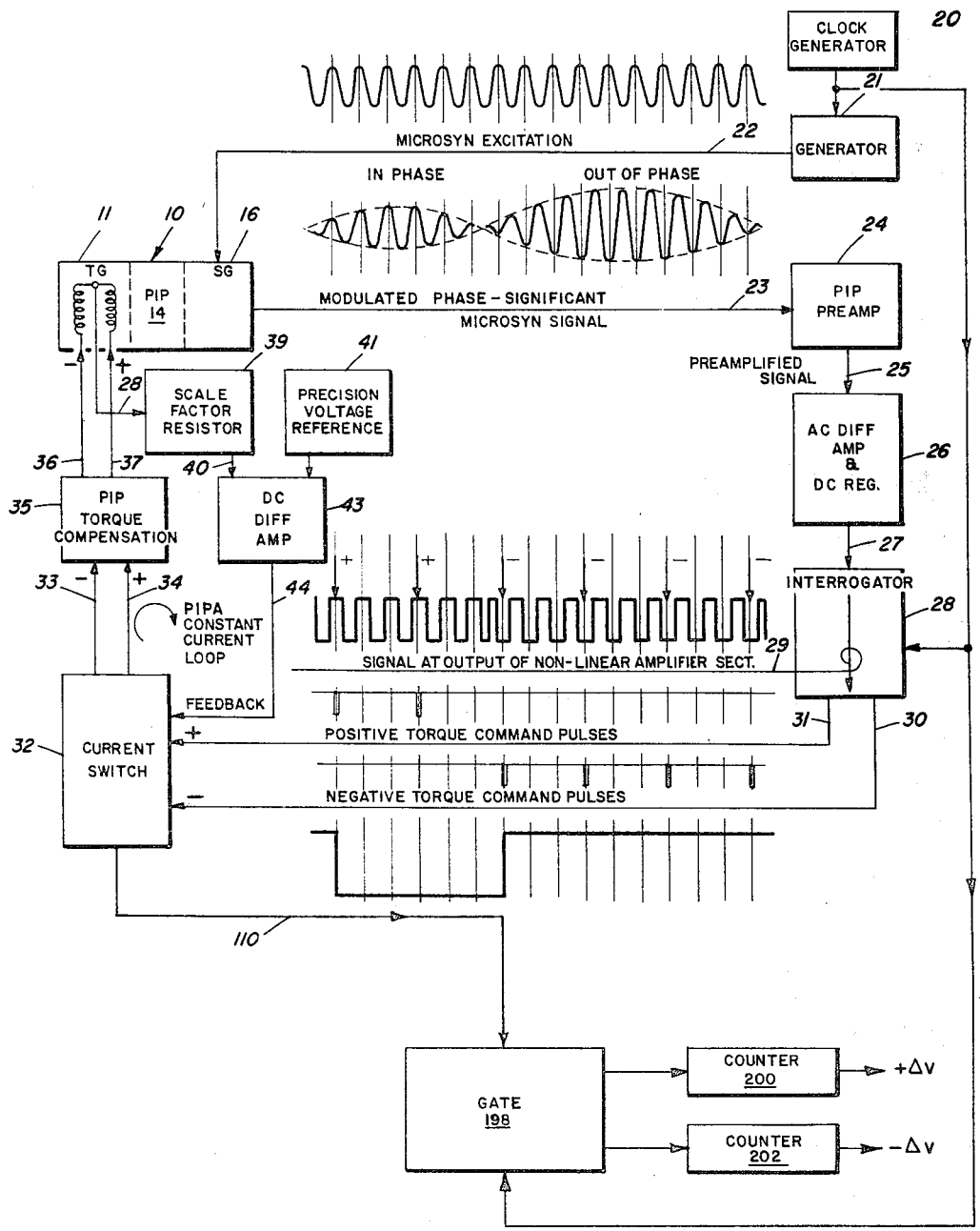
FIG. 3 shows a functional block diagram of the overall pulse integrating pendulum accelerometer components and the wave forms which are generated in the respective components.

The pulsed integrating pendulum accelerometer electronics shown in FIGS. 3 and 4 monitor the deflection angle of pendulum 14 and control the direction of the microsyn torque M so that the pendulum 14 is always driven toward a deflection angle of zero. It is apparent, however, that an oscillatory motion will result about the zero position since the direction of torque M is not changed until the pendulum has passed through its zero position. This action causes a small sinusoidal variation of the pendulous torque about the null or zero axis but since it is of sufficiently small magnitude, it will not invalidate its proportional relationship to acceleration.

Operation of the pulsed integrating pendulum accelerometer in the negative torque mode is shown in part A of FIG. 2. The pendulous torque P and the microsyn torque M are in opposing directions. Since M is a greater force than P, the pendulum moves toward the null line. When the pendulum has passed through null, the electronic components of the accelerometer change the direction of the microsyn torque M, and the accelerometer starts to operate in the positive torque mode, shown as part B. Again, the pendulum is driven back toward the null line, and when it has again passed through null the accelerometer again operates in the negative torque mode. This action continues until a stable condition about the zero or null axis exists.

If the pulsed integrating pendulum accelerometer is experiencing no acceleration, there is no pendulous torque P and the pendulum 14 is influenced wholly by the constant magnitude of torque M which operates for equal time intervals in the positive and negative torque modes.

Figure 4A:
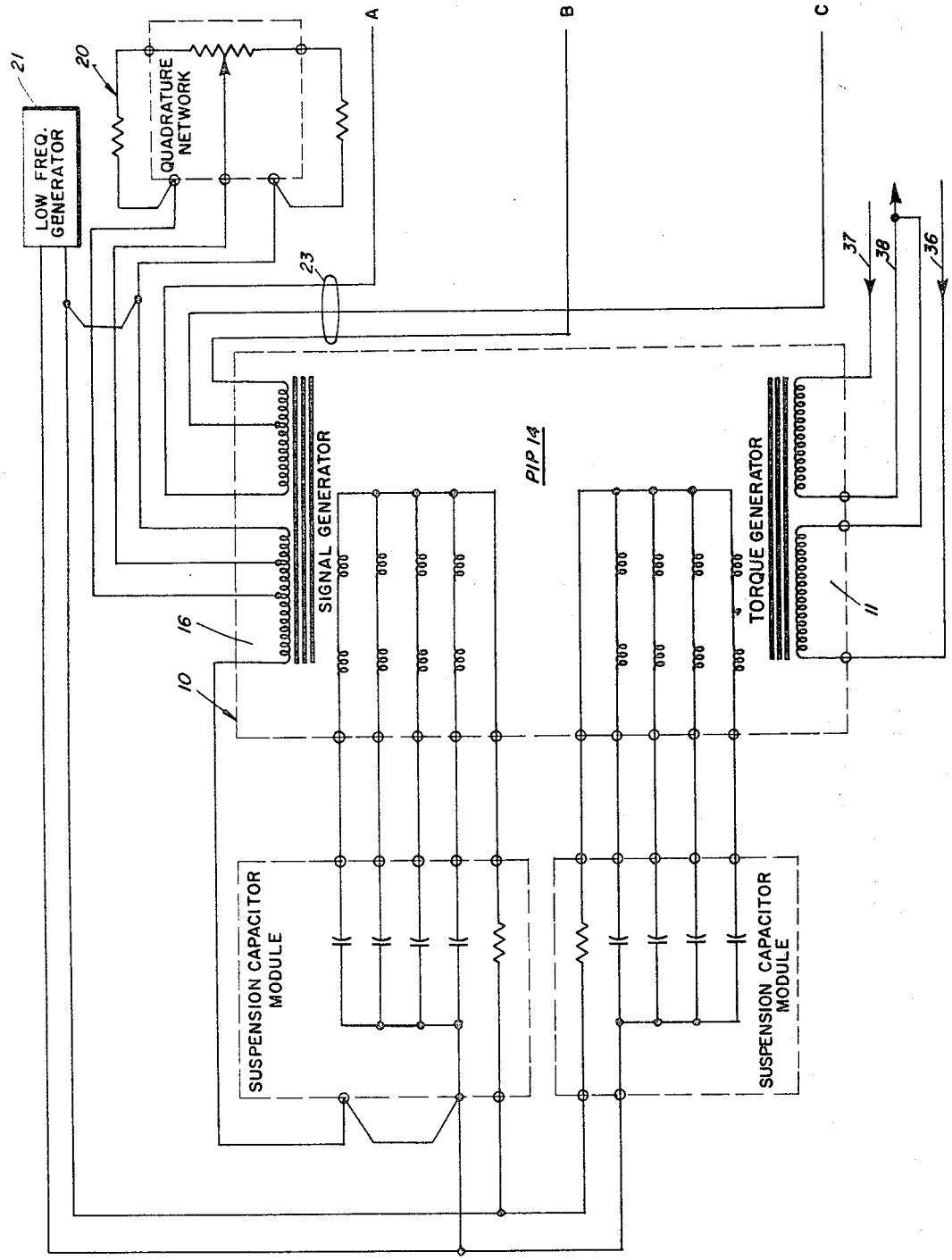

For a clear understanding of the following detailed description of the pulsed integrating pendulum accelerometer system reference should be made to FIG. 3 and FIG. 4A–F. FIG. 4A–F is a complete schematic diagram of a preferred embodiment of the invention. It should be noted that the component parts are blocked and numbered in the same manner as the blocks in the functional diagram of FIG. 3. Referring now to FIG. 4A, there is shown block 10 which is the electrical equivalent of the functional diagram of the pulse integrating pendulum of FIG. 1. The two banks of series tuned circuits which are fed by low frequency generator 21 provide the resonant circuits necessary for operation of the magnetic suspension system which is provided to supplement the jeweled bearing suspension of the pendulum 14 in the pulsed integrating pendulum case 11. Also shown in block 10 are the electrical equivalent circuits of the microsyn torque generator 11 and the microsyn signal generator 16.

Electrically connected to a portion of the signal generator microsyn windings 16 is a quadrature network designated generally as 20. This network primarily consists of a resistance network and operates to compensate that portion of a signal which is 90° out of phase with the ideal signal. Quadrature voltages are small in magnitude with respect to the total signal but they can cause problems in obtaining an accurate null or zero reference. The quadrature compensation network is used to tune a portion of the microsyn primary 16 so that if any parasitic voltages are generated they will be counterbalanced by the quadrature signal from the network 20.

The unmodulated frequency generated by frequency generator 21 is coupled to the signal generator microsyn 16. Whenever an acceleration force acts on pulse integrating pendulum 14, a modulated phase output is transmitted from the signal generator; this wave form is generally of the form as shown in FIG. 3. This modulated output from the signal generator microsyn winding 16 is electrically coupled by means of electrical cable 23 to the input terminals of preamplifier 24. This is accomplished by means of three electrical leads, one connected to ground terminal 45, and the other two connected to input terminals 46 and 47, respectively.

Generally, the function of the pulsed integrating pendulum preamplifier 24 is to accept the modulated output signal from the signal generator microsyn 16 and to voltage amplify this signal with accuracy. The pulse integrating pendulum accelerometer preamplifier 24 usually takes the form of a small signal, alternating current differental amplifier that is designed to have a high common mode rejection characteristic. This characteristic of the circuitry causes signals which appear in the same phase or common mode at both input terminals 46 and 47, respectively, since they do not constitute a difference between the two inputs, to add to zero in the circuitry and they will not appear in the output signal. Since undesired electrical noise signals are usually in the same phase at each input terminal 46 and 47, respectively, common mode rejection is useful in improving the signal to noise ratio of microsyn output.

The pulsed integrating pendulum accelerometer preamplifier 24 operates in the following manner. Assume that the polarity of voltage impressed across the circuit input is plus to minus across input terminals 46 and 47, respectively. A positive potential applied to the base of transistor 48 tends to increase the conduction of transistor 48, while the negative potential on the base of transistor 49 tends to decrease the conduction of transistor 49. As the conduction of transistor 48 increases, the base potential of transistor 50 drives toward zero volts because of the decrease voltage drop across transistor 48. Also, as the conduction of transistor 49 decreases, the base potential of transistor 51 rises towards the maximum positive potential of the power supply because of the increased voltage drop across transistor 49. A negative going potential on the base of transistor 50 causes this transistor to decrease its conduction. Therefore, the collector of transistor 50 drives more positive, resulting in an output at terminal 52, between terminal 52 and 54, which is in phase with the input signal measured at terminal 46 with respect to ground terminal 45. At the same time, the positive going potential applied to the base of transistor 49 causes transistor 51 to increase its conduction. Hence, the collector of transistor 51 drives more negative, resulting in a signal at terminal 53 which is out of phase with respect to the signal produced at terminal 52.

When the signal input to the preamplifier reverses in polarity to above sequence of events also reverses. Thus, it is apparent that both the positive and negative going portions of the input signal from the signal generator microsyn 16 is differentially amplified through the preamplifier 24.

The resistors and capacitors of the circuits are not numbered or described in detail as to their functional relationship in the overall circuit since their functional operation would be apparent to one skilled in the electrical circuitry art. The resistance capacitor network coupled between the two input signal terminals 46 and 47 are for impedance matching the pulsed integrating pendulum microsyn 16. All of the other capacitors are coupling capacitors except for the capacitor which connects from the positive potential to ground potential terminal 54. This capacitor is a bypass capacitor and effectively filters any power supply coupled alternating current signals to ground.

The output signals from preamplifier 24 are electrically coupled from output terminals 52 and 53 to input terminals 56 and 57 of the alternating current differential amplifier and voltage regulator block 26. These signals are coupled via cable 25. The primary function of this circuitry is to amplify and filter the pulsed integrating pendulum microsyn signal. In addition, circuitry is included to provide an accurately regulated positive and negative potential supply for the electronics of the pulsed integrating pendulum accelerometer.

The output signals from preamplifier 24 are fed over a twin conductor cable 25 to two signal input terminals 56 and 57 on A.C. differential amplifier and voltage regulator block 26. The function of this circuit is to amplify the signal voltage from the preamplifier accurately. This amplifier usually is of the form of a voltage amplifier which has a high common mode rejection characteristic; that is, it is designed so that any noise which is coupled into the input of the circuit does not appear at the output. This action is accomplished the same way as in the preamplifier input circuitry 24.

The A.C. differential amplifier and voltage regulator 26 during the course of normal circuit operation, assume that the polarity of the signal impressed across the input terminals 56 and 57, respectively, is plus to minus. A positive potential on the base of transistor 58 causes this transistor to increase in conduction and the negative potential on the base of transistor 59 causes transistor 59 to decrease in conduction. As the conduction of transistor 58 increases, its internal impedance decreases. Hence, the base potential of transistor 61 falls toward the negative potential, causing the conduction of transistor 61 to decrease. On the other hand, the decreased conduction of transistor 59 drives the base of transistor 62 more positive causing this transistor to increase its conduction. Since the emitters of transistor 61 and 62 are tied to the primary of transformer 63, current will flow through the transformer. Transformer 63 is arranged so that a 180° signal phase shift is obtained on the secondary winding. Therefore, the output voltage is in phase with the signal input. When the polarity of the circuit input voltage reverses, the above sequence of events also reverses so that at the output of the transformer, a differentially amplified input signal is produced. This signal is power amplified by emitter follower transistor 64, and electrically connected to the output terminal 65.

The transistorized stages in the A.C. differential amplifier obtain their bias voltage from a regulator circuit consisting of two diodes 66 and 67, respectively. The general function of the regulator circuit is to reduce non-linearities in the amplifier output signal which could result from power supply voltage variation.

The transistorized stage with transistor 69 and associated network is an emitter follower, the purpose of which is to supply an analog amplitude modulated output signal for monitoring purposes.

Transistor 68 which has its emitter connected to the junction of the two emitters of transistors 58 and 59 is an emitter follower circuit which acts as a constant current source for the input stage of the amplifier. This transistorized stage 68 also aids the common mode rejection character of the A.C. differential amplifier.

The function of the various electronic components such as resistor networks and capacitor networks throughout the A.C. differential amplifier and voltage regulator circuit have not been explained with any great particularity because it is felt their function in the circuitry would be apparent from the schematic configuration presented.

The outputs from the A.C. differential amplifier 26 are coupled via electrical cable 27 to signal input terminal 70 on interrogator 29. Additional output terminals are shown on block 26 such as 72, 73 and 74, respectively. These output terminals are connected to various subcomponents of the overall pulse integrating pendulum accelerometer. Their purpose is to provide a regulated positive and negative voltage to these various subcomponents.

The general function of the interrogator circuit 28 is to accept the modulated output signal from the A.C. differential amplifier circuit 26, convert this signal into a square wave, compare it to a clock pulse which may originate from a computer (not shown) or a clock generator 20 which has a predetermined frequency rate and provide a pulse output to the current switch. Thus, if the modulated input pulse train is positive going, in phase with the reference pulses, when the clock pulse occurs, a positive torquing signal will be transmitted from the interrogator 26. If the modulated input pulse train is negative going, out of phase with the reference, when the clock pulse occurs, a negative torquing pulse is issued from the interrogator circuit.

The modulated signal input at terminal 70 is applied to nonlinear transistorized circuit 75 and 76, respectively. Peak clipping diodes 77 and 78 are coupled to the first transistor circuit 75. There is also a peak clipping network consisting of diodes 79 and 80 coupled to the input of transistor 76. Diodes 72 and 78 clip the higher peaks of the incoming modulated signal to approximately one volt and apply this wave form to the base of transistor 75. Transistor 75 acts as a voltage amplifying switch that operates between a predetermined value of positive and negative voltage. The output signal of transistor 75 is clipped by the diode network 79 and 80 to produce a square wave pulse train to the base of transistor 76. The output of transistor 76 couples this pulse train to the primary of transformer 81 which forms a portion of the phase detecting section of the interrogator circuit 26. The output across the secondary of the transformer 81 will be 180° out of phase with the original input signal at terminal 70.

To better understand the operation of the circuitry, assume that the input signal on the primary of transformer 81 is plus to minus, that is from $P_1$ to $P_2$, respectively. The signal on the secondary will then be opposite or minus to plus from $S_1$ to $S_2$. The negative potential on the anode of diode 82 reverse biases this diode and applies the negative potential to the anode of diode 84. However, the positive potential on the anode of diode 83 will forward bias diode 83 and clamp the anode of diode 85 to zero volts.

The network of diodes 84, 85, 86 and 87 form logic AND gates. The input voltage of diode 86 and diode 87 is a negative going spike pulse produced from the clock pulse. This clock pulse may be originated in a clock pulse circuit in a computer circuit (not shown). The pulse voltage comes in to the interrogator circuit via input lead 29. The positive going clock pulse is applied to the base of transistor 100 and appears at the collector of transistor 100 as a negative going pulse. Collector resistor 105 and capacitor 106 differentiate the clock pulse to produce a negative going spike at the leading edge of the pulse and a positive going spike on the trailing edge of the pulse. The negative spike will reverse bias both diodes 86 and 87, respectively. Since diode 84 is reversed biased because of the assumed input polarity of the transformer 81, the potential on the cathodes of diodes 84 and 87 falls instantaneously to the negative potential when the spike occurs. However, the potential at the cathode junction of diode 85 and diode 86 remains near zero volts, because of the forwardly biased diode 85. The negative going spike and the zero volt potential are applied to steering diodes 95 and 96, respectively, of flip-flop circuit having transistors 93 and 94, respectively. Transistor 93 is driven into conduction clamping the collector of 93 and consequently the cathode of diode 92 to zero volts. The positive going spike produced on the trailing edge of the clock pulse is applied to the bases of transistors 88 and 89. Therefore, when this spike occurs transistor 88 is driven into conduction causing the collector potential of transistor to drive toward zero volts. Transistor 89 will not be able to conduct at this time because the emitter diode 91 is reversed biased by the flip-flop circuit. When the spike disappears, the spike potential of transistor 88 returns approximately to the maximum positive potential. As long as the flip-flop remains in its present state, a pulse will appear at the torque mode positive output terminal 97 whenever a clock pulse occurs. Whenever the induced potential on the transformer secondary of transformer 81 reverses, this occurs when the pulse integrating pendulum passes through null, the sequence of events narrated above will reverse, and pulses will appear at the torque mode terminal negative terminal 98 whenever a clock pulse occurs.

The phase detector section of the interrogator functional block 28 is that circuitry which is in the area of the transformer 81. This circuitry is designed to produce torque command pulses of equal amplitude. A requirement such as this is necessary since the current switch subcomponent 32, the subcomponent receiving these pulses, consists of a flip-flop circuit, transistor 107 and 108, respectively, that is set and reset by the interrogator torque command pulses. If for some reason, an interrogator torquing pulse were low in amplitude, the triggering of the current switch flip-flop transistors 107 and 108, would be delayed. A delay in triggering the current switch flip-flop would result in the torquing of the pulsed integrating pendulum and could also cause erroneous signals to be sent to the guidance computer (not shown). Hence, the interrogator pulse detector is designed so that all torquing pulses are equal in amplitude and of a predetermined width.

The torquing output signals, positive and negative, from the interrogator circuit are coupled to input junctions 101 and 102 on the current switch 32 via leads 30 and 31. An additional junction 99 on functional block 28 is coupled to the ground potential bus (not numbered). The general purpose of the current switch 32 is to accept the output from the interrogator and produce from the outputs positive and negative torquing signals. Also, the current switch 32 accepts an output from the D.C. amplifier and precision voltage reference subsystem 43 to produce from them a pulsed integrating pendulum accelerometer torque mode indication which is sent to the guidance computer as an indication of actual sensed acceleration.

Now, tracing the circuit from input terminals 101 and 102, respectively, the plus and minus torque command inpulses are transmitted to a flip-flop circuit consisting of transistor 107 and transistor 108. These pulses set or reset this flip-flop circuit. Positive pulses are the set input, and negative pulses are the reset input of the flip-flop circuit. Once the flip-flop has been set or reset, it remains set or reset until a pulse is received on an opposite line. Therefore, the function and not-function output of the flip-flop are square waves whose on time is a function of the interrogator pulses received.

The not-function output of the flip-flop is fed to emitter follower stage, transistor 104, which acts as a current amplifying switch. If the flip-flop is in the set state, the not-function output is zero volts and transistor 104 is not conducting. However, when the flip-flop is reset, the not-function output becomes a positive voltage and transistor 104 conducts. The output taken from the emitter stage and transmitted to output terminal 103 is either zero or positive maximum potential. This output on lead 110 is or may be sent to a guidance computer and the output will be in the form of a square wave pulse.

The function and not-function outputs of the flip-flop are also applied to the bases of emitter follower circuits 109 and 111, respectively. If the flip-flop circuit is set, transistor 111 conducts; if reset, transistor 109 conducts. The output of these amplifiers are square waves which are conducted via two diodes (not numbered) to output junctions 115 and 116 of the current switch 32.

It should be noted that the degree of conduction of transistors 109 and 111, respectively, is dependent upon the feedback signal received from terminal 114 via the constant current loop which is connected via line 44 from the output of the D.C. differential amplifier circuit 43. This controlled signal input is power amplified through the Darlington emitter follower arrangement of transistors 112 and 113, respectively, and applied to the collectors of transistors 109 and 111, respectively. The greater the control signal input from the D.C. differential amplifier, the greater will be the amplification of the flip-flop output voltage through transistors 109 and 111, since transistors 112 and 113 supply collector current to transistors 109 and 111. This provides a nominal voltage range of the plus and minus pulsed integrating pendulum accelerometer torquing signals which issue from the current subsection 32.

Figure 4B:
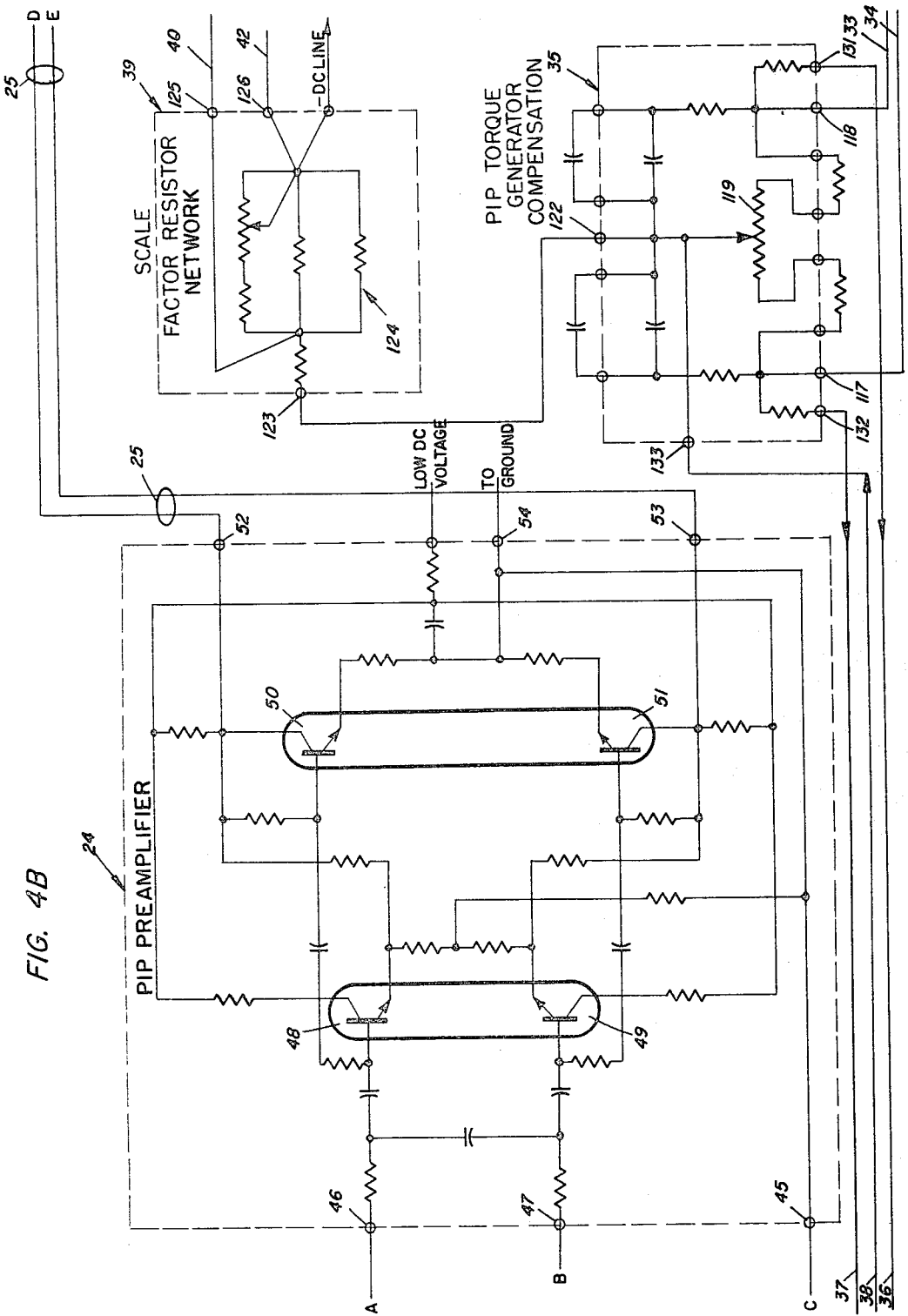
Figure 4E:
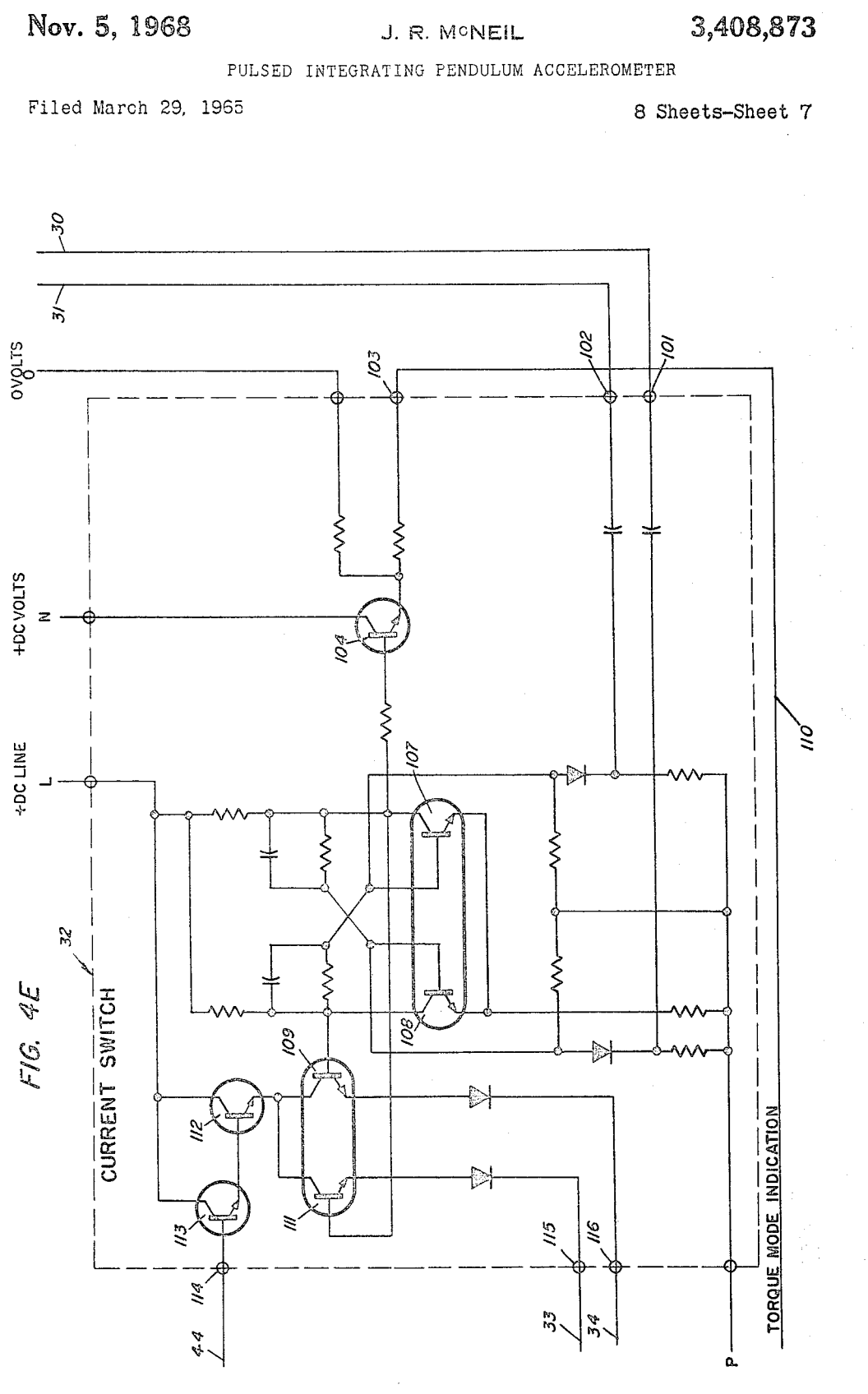
Figure 4F:
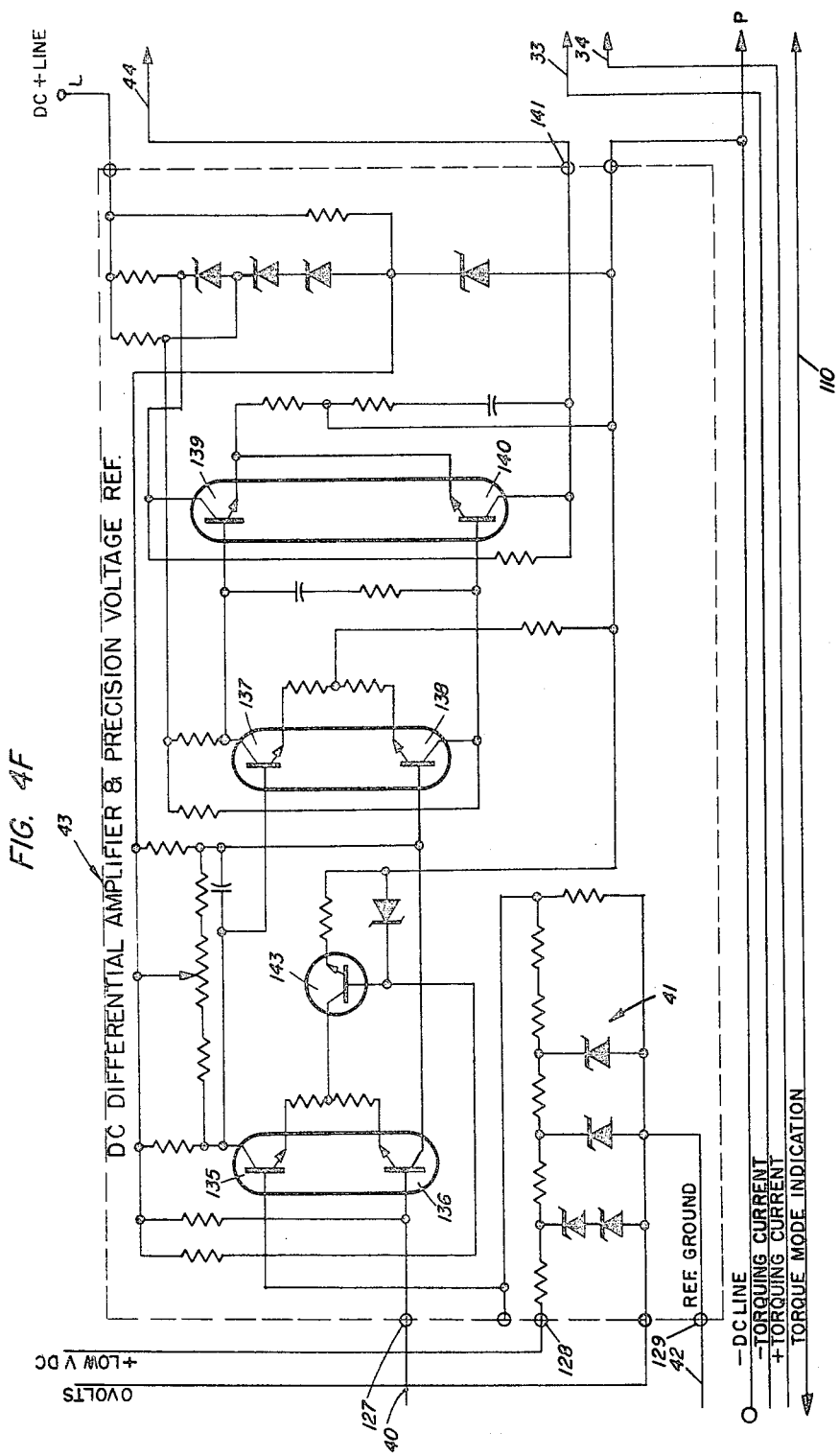

The two output terminals 115 and 116, respectively, of the current switch 32 are connected via electrical leads 33 and 34 to the input terminals 117 and 118 on the torque compensation network 35 (see FIG. 4B). The general function of this circuit is to provide a means for balancing the positive and negative pulsed integrating pendulum torque generator winding 11. This is accomplished by feeding the positive and negative torquing currents to a resistance capacitance network which is connected in parallel relationship with the positive and negative pulsed integrating pendulum torque generator windings 11. A common torque current return is conducted from the common side of the torque generator winding 11 via electrical lead 38 to terminal 133. This torque current return is connected to the wiper arm of a potentiometer 119. Since it is unlikely that both pulsed integrating pendulum torque generator windings 11 will have identical electrical characteristics, the potentiometer 119 and the network of resistors and capacitors provide a means for balancing the impedance of the windings and provides a purely resistive load for the current switch 32. An additional output terminal 122 connects to the wiper arm of potentiometer 119 and is connected via an electrical lead to input terminal 123 of scale factor resistor 39. The scale factor resistor is one of the subsystems of the D.C. constant current source which operates to maintain a constant amplitude of direct current through the torque generator windings. The feedback loop (see FIG. 3) consists of scale factor resistor 39, the precision voltage reference 41, and the D.C. differential amplifier 43.

The pulsed integrating pendulum torquing current return along lead 38 is returned to ground potential through the scale resistor 39, which is actually a network of resistors. The current which flows through this network of resistors is accurately indicated by the voltage developed across this network. This voltage is compared with the precision voltage reference by the D.C. differential amplifier. The precision voltage reference ground terminal 126 is coupled via electrical lead 42 to input terminal 129 to the voltage reference network generally designated as 41. An input voltage from the voltage source for the entire system is connected to terminal 128. The precision voltage network consists of a number of diodes and precision resistors. An output is taken from one side of the network and fed to the base of transistor 135. Another transistor 136 is coupled to junction 127 to receive the scale factor resistor voltage from the scale factor resistor voltage from the scale factor resistor 39.

The D.C. differential amplifier has three transistorized cascade stages, transistors 135 and 136, transistors 137 and 138, and transistors 139 and 140.

The two inputs fed to the first transistorized stage consisting of transistors 135 and 136 respectively are the feedback voltage from the scale factor resistor 39 and precision voltage from the precision voltage source 41.

Now, assume that the pulse integrating pendulum torquing current drops. The feedback input to the base of transistor 136 will become less positive, and conduction through transistor 136 is reduced causing its collector, and the base of transistor 138 to become more positive. This increases the conduction of transistor 138 causing its collector and the base of transistor 140 to become less positive. This action increases the conduction of transistor 140 causing its collector potential, the output circuit, to become more positive. The increased positive potential is transmitted to output terminal 141 and over electrical lead 44 to input terminal 114 on the current switch 32. This increased positive potential is applied to the base of transistor 113 in the current switch, thus causing increased conduction in transistor 113 and driving the base of transistor 112 more positive. This causes an increase in the conduction of transistor 112, thereby, increasing the torquing voltage as required to raise the current through the pulse integrating pendulum torque generator circuit. The second input to the D.C. differential amplifier is conducted from the precision voltage reference source to the base of transistor 135. Transistors 135, 137 and 139 amplify the voltage reference in much the same way as that amplified by the scale factor feedback current. The three stages of application in the D.C. differential amplifier makes the output signal responsive only to the difference between the precision voltage reference and the scale factor feedback voltage. The D.C. differential amplifier also has the common mode rejection characteristic as pointed out above in the explanation of the operation of the A.C. differential amplifier circuit 26.

Transistor 143 operates in conjunction with the Zener diode connected between its base and emitter circuit to provide a nearly constant emitter bias and current for transistors 135 and 136, respectively. This circuit materially contributes to the common mode rejection characteristic of this circuit.

The output, of course, is taken from terminal 103 in the current switch circuit 32. This output is transmitted over electrical lead 110 to, if desired, a computer circuit. The signal output of this system, the pulsed integrating pendulum accelerometer, is a square wave output which is representative of the acceleration sensed by the pulsed integrating pendulum unit.

In operation, the pulsed integrating pendulum will be considered as a closed system and only the inputs and outputs of this system will be examined. As pointed out above, there are two inputs (shown in FIG. 2) on the pendulum 15 when it is subjected to an acceleration along the IA or input axis. These inputs consist of the pendulous torque P and the microsyn torque M in the reverse direction. Although these two inputs are torques about the pendulum pivot axis, the pendulum 15 while oscillating continuously does not begin to rotate about the pivot axis. Hence, the sum supplied to the pendulum during a time interval must be zero. A balance of impulses cannot in general be obtained over a single pendulum cycle due to the incremental nature of the microsyn torque impulses but occurs only after a series of cycles. Whenever the pendulum has received a nonzero total impulse, the center of oscillation, or mechanical zero, has an angular velocity and progresses about the output axis. This is seen as deflection of the pendulum further in one direction and less in the other in each consecutive swing. The net angular velocity of the pendulum represents a stored acceleration. The average angle represents a stored linear velocity. When the net angular velocity has caused the mechanical zero to deviate sufficiently from the electrical null, the pendulum is given an extra increment of pulse, counter to the net angular velocity. This increment of impulse eliminates the stored velocity and is detected at the pulsed integrating pendulum accelerometer output as a velocity increment, or the integral of the instantaneous acceleration $Acc(t)$.

This may be demonstrated by the following torque equations applicable to unbalanced mass 14.

$$J_{(f)OA}\frac{d^2}{dt^2}[A_{(f)}(t)] + C_{(d)}\frac{d}{dt}[A_{(f)}(t)] + M_{(f)}(t) = 0 \quad (1)$$

$$M_{(f)}(t) = {}_{(acc)}(t) + M_{(tg)}(t) \quad (2)$$

$$M_{(Acc)}(t) = S_{(a)[Acc:M]} \cos A_{[IA-Acc]} |Acc(t)| \quad (3)$$

where:

$J_{(f)OA}$ = moment of inertia of the float about axis (OA)
$C_{(d)}$ = coefficient of viscous damping
$A_{(f)}$ = angle of float
$M_{(Acc)}$ = torque on mass due to acceleration of case
$M_{(tg)}$ = torque derived from torque generator
$S_{(a)}$ = pendulosity of float
$Acc(t)$ = acceleration applied to case As $M_{tg}(t)$ = constant, $A_{(IA-Acc)} = 0$, and time is quantized in units of $\Delta t$, the integral Equation 4 follows:

$$\int_0^{m(\Delta t)} Acc(t)dt = \frac{1}{S_{(a)}}\left\{\int_0^{m(\Delta t)} M_{(tg)}dt + J_{(f)OA}[\dot{A}_{(f)} - \dot{A}_{(f)0}] + C_{(d)}[A_{(f)} - A_{(f)0}]\right\} \quad (4)$$

Equation 4 is divided in Equation 5 into two components, component A which is proportional to the net torque applied to the float (i.e., integrated acceleration), and component B, an error term that is a function of the difference between the indicated and true angular deviation of the float (i.e., stored velocity).

$$\Delta V \int_0^{m(\Delta t)} Acc(t)dt = \underbrace{\frac{M_{(tg)}\Delta t}{S_{(a)}}\Sigma(n-p)}_{A} + \underbrace{\frac{J_{(f)OA}}{S_{(a)}}[\dot{A}_{(f)} - \dot{A}_{(f)0}] + \frac{C_{(d)}}{S_{(a)}}[A_{(f)} - A_{(f)0}]}_{B} \quad (5)$$

where:

$n$ = number of clock pulses in the period negative torque $-M_{tg}$ is applied
$p$ = number of clock pulses in the period positive torque $M_g$ is applied By proper design of the signal generator, the angular difference $(A_{(f)} - A_{(f)0})$ and its derivative is minimized and error component B becomes insignificant.

Consequently, as shown in Equation 6, the integral of acceleration or net change in velocity is proportional to a scale factor multiplied by the difference in periods over which negative and positive torques are applied to mass 14.

$$\int_0^{m(\Delta t)} Acc(t) = \Delta V = \underbrace{\frac{M_{(tg)}}{S_{(a)}}}_{\text{Scale Factor}} \underbrace{\Sigma(n-p)\Delta t}_{\text{Period Difference}} \quad (6)$$

It is apparent from FIG. 3 that these torquing periods are explicit in the output signal carried by line 110. When coupled to gate circuit 198, that signal enables clock pulses to accumulate in counters 200 and 202. Over the period the float is torqued in any direction, clock pulses accumulate in the corresponding counter. That is, during the period that positive torque pulses are applied to the float, the negative excursion of the signal on line 110 activates gate 198 and clock pulses register in counter 202. The number of pulses $n$ registered is directly related to the period over which positive impulse is applied to the float and is, therefore, a measure of the negative velocity increment $-\Delta V$. Similarly, upon the positive excursion of signal 110, counter 202 is disconnected from the gate circuit and counter 200 receives the clock pulses, whose sum is a measure of $+\Delta V$. The difference between the number of clock pulses registered in the two counters is $(n-p)$ and is thus, according to Equation 6, proportional to the net change in velocity $\Delta V$ of the case. Although velocity change rather than acceleration is the quantity desired, it may be observed that average acceleration is conveniently computed by integrating acceleration over each period cycle. In other words, in terms of pulse count, $$a_{avg} = \frac{M_{tg(n-p)}}{S_{a(n-p)}}$$

It is pointed out that the measured quantity $\Delta V$ of Equation 6 is very stable, and conveniently had; and this is one main feature of the instrument. Specifically, the scale factor is composed of parameters that are very stable over the operating term of the instrument. The period difference, which constitutes the only variable, is in terms of the number of pulses summed and requires no real time measurement. Real time computations are thus not needed and this advantage simplifies the instrument. Also, the variable is not critical in terms of signal stability as counters accept pulses of varying sizes and shapes while still counting toward a definite sum. Moreover, as the interrogation pulses are directed to switch 32 at the same frequency as the gate is switched by the wave form on line 110, the latter is positive or negative over an integral number of clock pulses and the pulse difference $(n-p)$ is an integer.

Gate 198 and counters 200 and 202 are circuits considered well within the art and are thus not further described.

In summary, it is now apparent that the instant invention supplies an apparatus and technique of generating a digital square wave output voltage which is proportional to the linear acceleration experienced by the pulse integrating pendulum accelerometer system. This apparatus may be used any place where an acceleration is to be sensed and there is needed a digital output from the accelerometer which is proportional to the acceleration. In addition, the design of the electronic subsystems of the accelerometer are adaptable to transistorized units.

What is claimed is:

1. An accelerometer system for use with ballistic missile guidance systems, comprising:
   pulsed integrating pendulum means for producing modulated output signals that are representative of motion of said pendulum means,
   phase comparing means coupled to receive the modulated output signal and to convert said modulated output signal into positive and negative torquing signals, and
   current switch means electrically coupled to receive the positive and negative torquing signals,
   said current switch containing a feedback loop wherein said feedback loop includes a precision voltage reference means,
   whereby the output from said current switch means is an electrical signal that is an indication of actual sensed acceleration of said pendulum means.

2. The acceleration system of claim 1 wherein said feedback loop is coupled via said pendulum means, said feedback loop comprising:
   pulsed integrating torque compensation means receiving an output from said current switch means for providing balancing of said positive and negative torquing signals,
   said pendulum means coupled to receive the balanced positive and negative torquing signals from said pulsed integrating torque compensation means,
   scale factor resistor means coupled to receive current from said pendulum means, and
   direct current differential amplifier means coupled for receiving an indication of the potential across said scale factor resistor representative of the current flow from said pendulum means, said direction current differential amplifier means coupled to transmit to said current switch means an error signal that increases or decreases said positive and negative torquing signals.

3. The acceleration system of claim 2 wherein said feedback loop precision voltage reference means provides a voltage reference for comparing the potential across said scale factor resistor.

4. The acceleration system of claim 2 wherein said differential amplifier compares the precision voltage reference means to the potential across said scale factor means to obtain a different voltage for transmitting to said current switch means.

5. An accelerometer system, comprising:

pulsed integrating pendulum means, operatively coupled to rotate torque generator means and signal generator means, said signal generator means producing an electrical output representative of rotary movement of said pulsed integrating pendulum means about its longitudinal axis, interrogator means coupled to receive said signal generator signal output, said interrogator means comparing said signal generator signal output with reference frequency means thereby producing a positive or negative output signal, current switch means coupled to receive signals from said interrogator means, said current switch means transmitting the received signals through a feedback loop via said torque generator means, wherein said feedback loop includes a precision voltage reference means, and output means from said current switch for providing an output signal that is in digital form and is representative of the acceleration sensed by said pulsed integrating pendulum means.

6. An accelerometer system of the pendulous type that has a digital output and which is capable of being used with ballistic missile guidance systems, comprising in combination:

acceleration indicating means for providing a modulated signal that is representative of an acceleration, interrogator means coupled to receive the modulated output from said first acceleration indicating means to provide signal outputs of positive and negative polarities, and current switch means having a feedback loop coupled via said acceleration indicating means and coupled to receive the output of said interrogator, wherein said feedback loop includes a precision reference voltage means, whereby the feedback loop feeds signals of a varying amplitude to said acceleration indicating means to bring its output to zero.

7. An accelerometer system comprising:

pulsed integrating pendulum means, said pulse integrating pendulum means having an unbalanced pendulum mass;

first microsyn means mechanically coupled to sense angular movement of said unbalanced pendulum mass about the longitudinal axis of said pulsed integrating pendulum means, and to convert these angular movements into proportional electrical output signals, differential alternating current preamplifier means electrically coupled to said first microsyn means for providing amplification of the electrical output signals, differential amplifier means coupled to receive the amplified output signals from said differential alternating current preamplifier means for providing an amplified and filtered output signal that is representative of the output from said preamplifier means, interrogator means coupled to receive the output signal from said differential amplifier means for converting the output signal into a square wave pulse train, said interrogator means having a reference frequency square wave pulse for comparing said square pulse train to determine the polarity of said square wave pulse train, plurality of outputs from said interrogator means coupled to current switch means, said plurality of outputs having either positive or negative going pulses, said current switch having two feedback loop outputs, said feedback loop outputs being of different polarities and coupled to pulsed integrating pendulum torque compensation network with two outputs, second microsyn means mechanically coupled to said unbalanced pendulum mass to move said unbalanced pendulum mass either clockwise or counter-clockwise and, said microsyn means coupled to said torque compensation for rotating said unbalanced pendulum mass in response to its signal output, scale factor resistance means coupled to receive a signal for said second microsyn means, precision voltage reference source, direct current differential amplifier means coupled to receive signals from said scale factor resistor and said precision voltage reference source for providing a signal output that is representative of the difference between the two signals, said direct current differential amplifier coupled to said current switch, and current switch output mens having an output signal that is representative of the acceleration sensed by said pulsed integrating pendulum means.

8. An accelerometer system comprising:

pulsed integrating pendulum means, said pulse integrating pendulum means having an unbalanced pendulum mass, first microsyn means mechanically coupled to sense angular movement of said unbalanced pendulum mass about the longitudinal axis of said pulsed integrating pendulum means, and to convert these angular movements into proportional electrical output signals, differential alternating current preamplifier means electrically coupled to said first microsyn means for providing amplification of the electrical output signals, differential amplifier means coupled to receive the amplified output signals from said differential alternating current preamplifier means for providing an amplified and filtered output signal that is representative of the output from said preamplifier means, interrogator means coupled to receive the output signal from said differential amplifier means for converting the output signal into a square wave pulse train, clock generator means coupled to be locked in phase with said first microsyn means and also coupled to supply a reference signal to said interrogator means, plurality of outputs from said interrogator means coupled to current switch means, said plurality of outputs having either positive or negative going pulses, said current switch having two feedback loop outputs, said feedback loop outputs being of different polarities and coupled to pulsed integrating pendulum torque compensation network with two outputs, second microsyn means mechanically coupled to said unbalanced pendulum mass to move said unbalanced pendulum mass either clockwise or counter-clockwise and, said microsyn means coupled to said torque compensation for rotating said unbalanced pendulum mass in response to its signal output, scale factor resistance means coupled to receive a signal for said second microsyn means, precision voltage reference source,
direct current differential amplifier means coupled to receive signals from said scale factor resistor and said precision voltage reference source for providing a signal output that is representative of the difference between the two signals, said direct current differential amplifier coupled to said current switch, and
current switch output means having an output signal that is representative of the acceleration sensed by said pulsed integrating pendulum means.

9. The accelerometer system of claim 7 wherein said current switch output means, comprises:
gating means, and
first and second counter means.

References Cited

UNITED STATES PATENTS

| | | | |
|---|---|---|---|
| 2,988,737 | 6/1961 | Schroeder | 73—517 X |
| 3,028,550 | 4/1962 | Naydan et al. | 73—517 X |
| 3,078,725 | 2/1963 | Jimerson et al. | 73—517 |
| 3,081,637 | 3/1963 | Gevas | 73—517 |
| 3,131,564 | 5/1964 | Romberg | 73—517 X |
| 3,192,371 | 6/1965 | Brahm | 73—517 X |

JAMES J. GILL, *Primary Examiner.*